(12) United States Patent
Kerr et al.

(10) Patent No.: US 11,907,140 B2
(45) Date of Patent: *Feb. 20, 2024

(54) SERIAL INTERFACE FOR SEMICONDUCTOR PACKAGE

(71) Applicant: Kioxia Corporation, Tokyo (JP)

(72) Inventors: Benjamin Kerr, Overstone (GB); Philip Rose, Islip (GB); Robert Reed, El Dorado Hills, CA (US)

(73) Assignee: KIOXIA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/699,942

(22) Filed: Mar. 21, 2022

(65) Prior Publication Data
US 2023/0092000 A1 Mar. 23, 2023

Related U.S. Application Data

(63) Continuation of application No. 16/054,755, filed on Aug. 3, 2018, now Pat. No. 11,281,603.

(51) Int. Cl.
| | | |
|---|---|---|
| *G06F 13/16* | (2006.01) | |
| *G06F 13/42* | (2006.01) | |
| *H04L 1/00* | (2006.01) | |
| *G06F 1/3234* | (2019.01) | |

(52) U.S. Cl.
CPC ........ *G06F 13/1689* (2013.01); *G06F 1/3243* (2013.01); *G06F 13/4291* (2013.01); *H04L 1/004* (2013.01)

(58) Field of Classification Search
CPC ............... G06F 13/1689; G06F 1/3243; G06F 13/4291; H04L 1/004

USPC ......................................................... 714/776
See application file for complete search history.

(56) References Cited

U.S. PATENT DOCUMENTS

| | | | |
|---|---|---|---|
| 6,988,227 B1 | 1/2006 | Perrott | |
| 7,353,443 B2 | 4/2008 | Sharma | |
| 7,433,442 B2 | 10/2008 | Briones | |
| 8,634,510 B2 | 1/2014 | Kong et al. | |
| 10,089,173 B2 | 10/2018 | Sengoku | |
| 2007/0226442 A1* | 9/2007 | Lai ...................... | G06F 13/4291 |
| | | | 711/167 |

(Continued)

FOREIGN PATENT DOCUMENTS

| | | |
|---|---|---|
| CN | 106844246 A | 6/2017 |
| TW | 200731275 A | 8/2007 |

OTHER PUBLICATIONS

International Search Report and Written Opinion for corresponding International Application No. PCT/IB2019/056581, dated Dec. 3, 2019, 9 pages.

(Continued)

*Primary Examiner* — James C Kerveros
(74) *Attorney, Agent, or Firm* — Foley & Lardner LLP (57) ABSTRACT

A system for serial communication includes a controller, a semiconductor package comprising a plurality of semiconductor die, and a serial interface configured to connect the plurality of semiconductor die to the controller. The serial interface includes a controller-to-package connection and a package-to-controller connection, and the serial interface is configured to employ a signaling protocol using differential data signaling with no separate clock signals.

23 Claims, 8 Drawing Sheets

(56) References Cited

U.S. PATENT DOCUMENTS

| | | |
|---|---|---|
| 2008/0080261 A1 | 4/2008 | Shaeffer et al. |
| 2008/0159019 A1 | 7/2008 | Sutardja |
| 2010/0169704 A1 | 7/2010 | Yu et al. |
| 2012/0177159 A1 | 7/2012 | Kong et al. |
| 2012/0311371 A1 | 12/2012 | Shaeffer |
| 2013/0235638 A1 | 9/2013 | Sutardja |
| 2014/0219031 A1 | 8/2014 | D'Abreu et al. |
| 2014/0372791 A1 | 12/2014 | Adachi et al. |
| 2015/0106560 A1 | 4/2015 | Perego et al. |
| 2015/0270000 A1 | 9/2015 | Perego et al. |
| 2015/0370735 A1* | 12/2015 | Pitigoi-Aron ......... G06F 13/364 710/110 |
| 2016/0224506 A1 | 8/2016 | Yoon |
| 2018/0062887 A1 | 3/2018 | Sengoku |

OTHER PUBLICATIONS

Office Action with a Search Report issued in a Chinese application No. 201980060559.4, dated May 11, 2023.

* cited by examiner

SERIAL INTERFACE FOR SEMICONDUCTOR PACKAGE

CROSS-REFERENCE TO RELATED APPLICATION

This application is a continuation of U.S. patent application Ser. No. 16/054,755, filed Aug. 3, 2018, the entire contents of all of which are incorporated herein by reference.

TECHNICAL FIELD

The present disclosure generally relates to systems and methods for improved communication with a semiconductor package using a serial interface.

BACKGROUND

Some semiconductor package devices include multiple die. For example, a flash memory package, such as a NAND flash package, may include multiple NAND flash die. A controller may be used to enable communication with the NAND flash package, and connecting the controller to the NAND flash package may involve connecting the multiple die in parallel via a multi-drop parallel bus to the controller. This may increase the capacitive load on controller pins used for such a connection, which can lower an operating frequency of the connection and thus lower a speed at which the connection operates. In addition, in order to maintain signal integrity on the bus, on die termination (ODT) may be implemented. Both the increased capacitive load and the use of ODT increases the power consumed by the controller to drive the bus.

Other approaches to enabling communication with the NAND flash package include the use of serial protocols, such as MMC (Multi Media Card) and SPI (Serial Peripheral Interface), but these are limited to low speed applications in flash memory for consumer devices such as mobile phones, tablets and cameras. These protocols are not suitable for high speed applications such as the use of NAND flash memory devices in SSDs (Solid State Drives)

There is therefore a need for an interface connection of NAND flash devices that consumes less power and yet is capable of operating at speeds required by SSDs.

BRIEF DESCRIPTION

One or more embodiments described herein address at least this issue and use a serial interface. Systems and methods described herein provide for improved communication between a controller and a semiconductor package device that includes one or more integrated circuit (IC) packages (e.g. separately encapsulated IC packages). One or more of the IC packages may include a plurality of die. In some embodiments, a serializer/deserializer (Ser/Des) technique is implemented. For example, the plurality of die are connected in parallel to a parallel interface of a bridge device, and the bridge device implements a serial connection (e.g. a high speed serial connection, such as a connection that operates at speeds of about 10 Mega-transfers (MTs) or more per second) with the controller via a serial interface. The controller may be referred to herein as an "external" controller, and may be, for example, a controller of a solid-state drive (SSD). Thus, a high speed connection may be established while keeping a pin count of the controller low by using the external serial connection, and a bandwidth per pin for the external controller may be high, relative to alternative implementations. In some embodiments, a differential signaling protocol may be used for the serial connection, providing for an improved ability to manage electromagnetic interference other noise, and providing for a connection over an extended distance. The signaling protocol may specify including a clock signal embedded in a data stream, rather than using an external clock signal, which can provide for the avoiding skew between a data signal and a clock signal. Furthermore, the signaling protocol may implement a low voltage protocol, and both the signaling protocol and other protocols may provide for improved power management techniques that use less power than certain alternatives, as described further herein.

In some embodiments the bridge device is encapsulated with the one or more IC packages in the semiconductor device package, and an external pin count of the semiconductor device package may thus also be kept low. In some embodiments, a plurality of IC packages are respectively connected to the controller via a plurality of serial connections, thus providing for a high speed connection.

In one or more embodiments, according to a first aspect, a system for serial communication includes a controller, a semiconductor package comprising a plurality of semiconductor die, and a serial interface configured to connect the plurality of semiconductor die to the controller. The serial interface includes a controller-to-package connection and a package-to-controller connection, and wherein the serial interface is configured to employ a signaling protocol using differential data signaling with no separate clock signals.

In one or more embodiments, according to a second aspect, a semiconductor package includes a plurality of flash memory die and a bridge device. The bridge device includes a high-speed serial interface connected to an external controller, and a parallel interface connected to a plurality of semiconductor die in parallel. The high-speed serial interface is configured to employ a signaling protocol using differential data signaling with no separate clock signals In one or more embodiments, according to a third aspect, a method for communication for a semiconductor package that includes a package controller, a serial interface, and a parallel interface, includes receiving, by the serial interface from an external controller, a first communication comprising device identity information, the first communication configured according to a differential data signaling protocol with no separate clock signal, and identifying, by the package controller, a first semiconductor die based on the device identity information. The method further includes routing, by the package controller, a second communication to the first semiconductor die via the parallel interface, receiving, by the package controller from the first semiconductor die, via the parallel interface, a third communication, and transmitting, by the package controller to the external controller via the serial interface, a fourth communication based on the third communication using the differential data signaling protocol with no separate clock signal.

DETAILED DESCRIPTION

The embodiments described herein provide for certain improvements to a system or method for communication between a controller and a semiconductor package device, including providing for a reduced pin count for the controller, a reduced pin count for the semiconductor package, lower power consumption while still maintaining a high speed connection. One or more of the embodiments described herein implement a bridge device that uses a Serializer/Deserializer (Ser/Des) technique to facilitate communication between a plurality of die of the semiconductor package device and the controller. The Ser/Des technique may include use of a variable speed shift register operating at speeds up to, equal to, or greater than, 10 MT per second. The speed may be varied according to the system data throughput requirements or system power consumption requirements. For example, if the controller receives a high rate of data transfer requests it may increase the shift register speed in order to maintain data transfer performance; conversely if the controller receives a low rate of data transfer requests it may reduce the shift register speed in order to reduce the power consumed. The Ser/Des technique may include the use of differential signaling, where only data signals are employed and where a clock signal is embedded in the data signals by the serializer and recovered from the data signals by the deserializer. The bridge device may implement certain Ser/Des protocols described herein to facilitate communication between the plurality of die of the semiconductor package device and the controller. In some embodiments, the bridge device may be omitted, and a plurality of serial connections between the plurality of die of the semiconductor package device and the controller are implemented, to enable high speed communication (e.g. higher speed communication than is provided for by a parallel connection to a controller).

Figure 1:
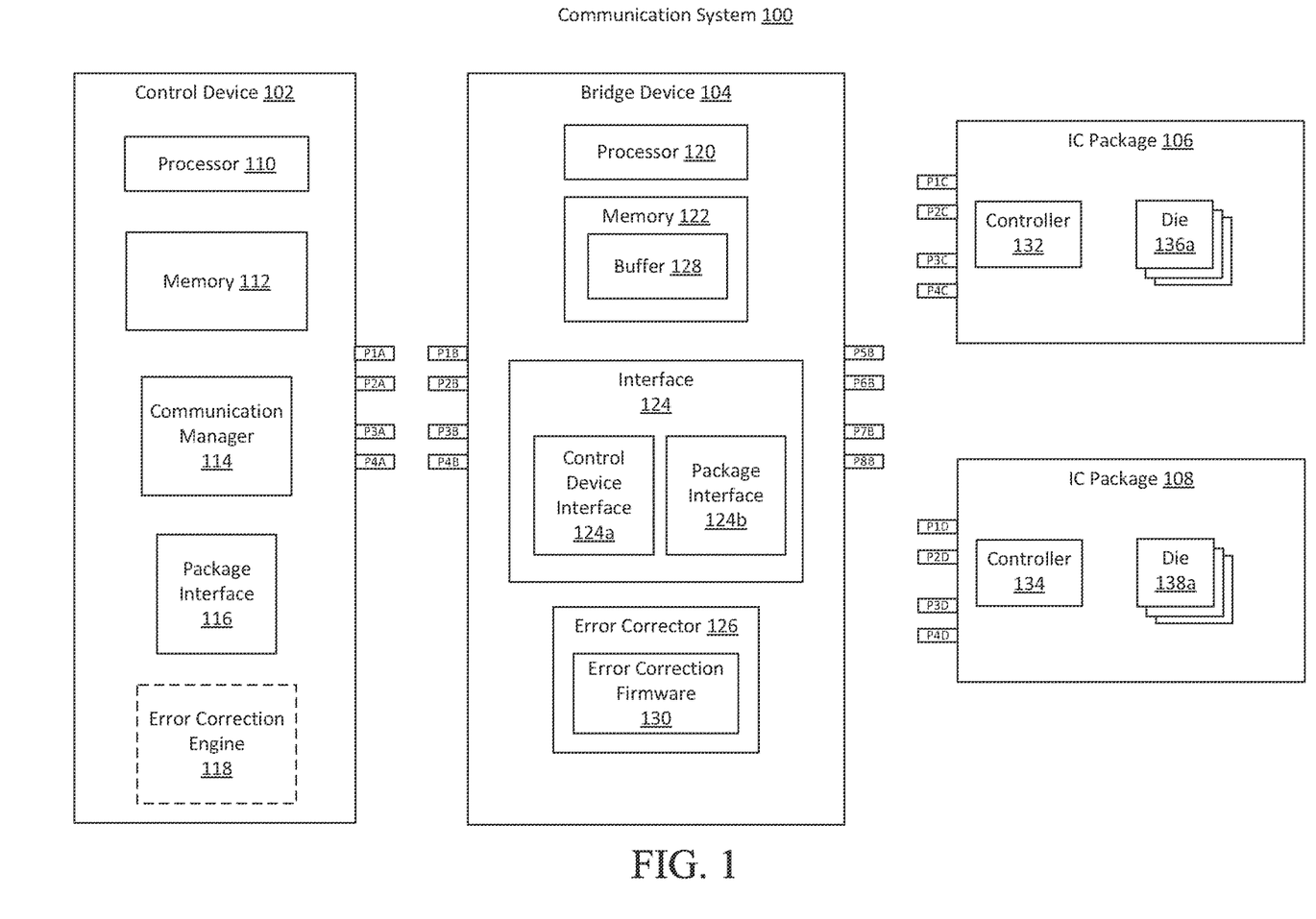
FIG. 1 shows a block diagram of a communication system that implements a serial interface according to one or more embodiments of the present disclosure.

FIG. 1 shows a block diagram of a communication system 100 that implements a serial interface according to one or more embodiments of the present disclosure. The communication system 100 includes a control device 102, a bridge device 104, an integrated circuit package 106, an integrated circuit package 108, and pins P1A through P4A. The communication system 100 may be a memory system, such as a flash memory system of an SSD device. The system may provide for high speed communication with flash memory, including read and write processes, and may implement error correction functionalities described herein.

The control device 102 may be an SSD controller configured to manage communications between an external device and the IC packages 106 and 108, such as read/write requests. The control device 102 may include a solid-state disk controller IC containing a system-on-chip (SoC) implementation, one or more processors, RAM, ROM, a host interface, a flash interface, hardware accelerators, and error-correction logic. In the embodiments depicted in FIG. 1, the control device 102 includes a processor 110 (e.g. one or more microprocessors, application-specific integrated circuits (ASICs), a field-programmable gate array (FPGA), etc., or combinations thereof), a memory 112, a communication manager 114, a package interface 116, and an error correction engine 118. The memory 112 may include one or more functional modules, including logic for accessing or managing the communication manager 114, the package interface 116, and the error correction engine 118.

The communication manager 114 may include logic, hardware, or firmware for managing communication with the IC packages 106 and 108. For example, the communication manager 114 can receive and process requests from an external device seeking to access one or more of the IC packages 106 and 108, such as read requests or write requests. In some embodiments, the communication manager 114 can manage reports received from the IC packages 106 and 108, and can transmit a corresponding report or request to the external device. The communication manager 114 may implement one or more protocols for communicating with the IC packages 106 and 108 via the bridge device 104.

In some embodiments, the communication manager 114 includes a lookup table or other data structure that associates a unique system address with device identity information. For example, the device identity information may include an identifier of an IC package. The communication manager 114 may receive a request to access memory corresponding to the unique system address, and the communication manager 114 may generate one or more access requests (e.g. a read or write request) to transmit to the bridge device 104 using the lookup table, the access request including, or routed based on, the device identity information. In some implementations, the device identity information specifies one or more die of the specified IC package. In some implementations, the device identity information omits specifying a die of the specified IC package, and the bridge device 104 is configured to determine a die to be accessed based on information included in the access request and, for example, a lookup table, as described in more detail herein.

The package interface 116 may include logic, hardware, or firmware for implementing a Ser/Des protocol for communicating with the bridge device 104. Any of the functionality described herein with regard to the package interface 116 of the control device 102 may be implemented by a control device interface 124a of the bridge device 104, in some embodiments. Any of the functionality described herein with regard to the package interface 116 of the control device 102 may be implemented in conjunction with the control device interface 124a of the bridge device 104.

In some embodiments, the package interface 116 implements a Ser/Des protocol including functionality for serializing data to be transmitted via a serial interface, and functionality for deserializing data received via the serial interface. In some embodiments, the Ser/Des protocols implement a Finite Impulse Response Filter (FIR) at the transmitting side to pre-compensate the signals for transmission and a Decision Feedback Equalizer (DFE) employing a training phase of equalization at the receiving side, to enable automatic adjustment for signal lengths and transmission line characteristics of the signal to take account of any connectors and printed circuit board traces used between the controller and the semiconductor package.

The Ser/Des protocol may include a variable speed shift-register implementation. The Ser/Des protocol may operate at a variable speed up to, equal to, or great than, 10 MTs a second. The Ser/Des protocol can provide for multiple high-speed links being combined into 'lanes,' so that, for example, a 4-lane high-speed serial interface could operate at over 40 Giga Transfers (GTs) per second. In some embodiments, the Ser/Des protocol implements an encoding technique, such as PAM-4 encoding, and provides for a single SerDes lane to operate at 40 GTs per second. Thus, the Ser/Des protocol may provide for a 4-lane PAM-4 connection that operates at over 160 GTs per second.

In some embodiments, the Ser/Des protocol may include a signaling protocol for serial transmission of data. The signaling protocol may provide for transmitting a signal that includes an encoded clock signal (e.g. embedded in a body of a data packet), or a clock signal that can be extracted from a body of a data packet. The signaling protocol may include transmitting a signal without a separate clock signal. This can provide for avoiding skew between a data signal and a clock signal, and can facilitate changing a distance over which the serial connection operates without significantly impacting the quality of the signal.

In some embodiments, the signaling protocol may include differential signaling. Differential signaling can provide for improved handling of electromagnetic interference (EMI). For example, because differential signaling is based on a difference between two transmitted signals, any EMI that affects both signals in a same or similar manner may be cancelled out when determining a difference between the signals, thus providing for resistance to the signal quality degradation effects of EMI (e.g., as compared to an embodiment employing single-ended signaling that compares a received signal to a local ground, wherein only the received signal may be subject to EMI and the EMI may thus be difficult to account for). The differential signaling may be employed at low voltage, which can help to reduce power consumption, and may provide for a high common mode rejection ration (CMRR) that can be readily implementing in noisy environments. In some embodiments, the signaling protocol may include low-voltage differential signaling (LVDS), which can effectively operate at low power over long distances. In some embodiments, the signaling protocol may include current mode logic (CIVIL), which can provide for a point-to-point, unidirectional signaling protocol.

In some embodiments, the package interface 116 may receive signals from the bridge device 104 via the pins P1A and P2A. For example, such signals may be differential signals received via the pins P1A and P2A. The package interface 116 may process the received signals, or may transmit the received signals to the communication manager 114 for processing. The package interface 116 may transmit signals to the bridge device 104 via the pins P3A and P4A. For example, such signals may be differential signals sent via the pins P3A and P4A. Thus, the control device 102 may interface with the bridge device 104 via at least 4 pins. In some embodiments, the control device 102 may interface with the bridge device 104 via no more than 4 pins. In some embodiments, the control device 102 includes at least two additional pins for receiving signals from the bridge device 104, and at least two additional pins for transmitting signals to the bridge device 104. Thus, the control device 102 may interface with the bridge device 104 via at least 8 pins, in some embodiments. In some embodiments, the control device 102 may interface with the bridge device 104 via no more than 8 pins.

In some embodiments, the electrical connections used by the package interface 116 (e.g. any of the pins P1A through P4A) can support "hot-swap", and can provide for adding or removing a powered IC package while the control device 102 is powered-on, without causing damage to either device.

In some embodiments, the bridge device 104 implements an photonic (e.g. fiber-optic) connection to the control device 102, which can provide for electrical isolation between the two devices. The photonic connection can also provide for an extended distance between the two devices. Implementation of a photonic connection may introduce additional latency, and a communication protocol (e.g. as described herein) may be configured to tolerate completion of commands with variable latency.

In some embodiments, the package interface 116 implements a physical coding sublayer (PCS) protocol that allows an original transmit clock to be recovered. For example, the PCS may utilize an encoding scheme such as 8B10B, 64B65B, 64B66B, 128B130B, DSQ128 to ensure that the original transmit clock can be recovered by the receiving device. The PCS protocol may provide for grouping multiple serial connections together to create a lane. The PCS protocol may provide for different physical layer signaling schemes, such as NRZ or PAM-4 to provide for short or long interconnect distances between the control device 102 and the bridge device 104. The PCS protocol may also provide for determining that a particular channel or lane is inactive (e.g. by detecting a terminal resistance across a pair of differential transmission pins), and the corresponding Ser/Des connection may be inactivated or put in sleep mode or a standby state to save power. The PCS protocol may also support side-band functions to allow other control and status messages to be transferred by the control device 102.

In some embodiments, the PCS protocol includes initialization, training or protocol negotiation with the bridge device 104, which can provide for, among other things, initializing at least one new control device 102, bridge device 104 or IC package 106 or 108, and ensuring backwards compatibility with older such devices. In some embodiments, the insertion of a new IC package in the communication system 100 is communicated using the high-speed serial protocol. The PCS protocol may include a training mode to allow a receive equalization function to be tuned to particular characteristics of the high-speed connection. For example, the training mode may include changing the pre- and post-cursor FIR taps, and adjusting the DFE taps in the receiver.

Following link training, the communication protocol implemented by the control device 102 provides for the control device 102 querying a number of connected die (e.g. NAND flash die) and/or a number of connected IC packages. The communication protocol may provide for the number being reported by the bridge device 104 following reception of an "identify device" transmitted by the control device 102. After determining how many die are connected, according to the communication protocol, the control device 102 can implement a "unique system address" mechanism, allowing commands to be directed to a particular die. The address may be in a known location in the communication protocol to allow for easy decoding. An address field may also be used by inter-connect components in a "tree" topology to uniquely identify a single die in a complex topology. In some embodiments, serial-to-serial bridge devices 104 may be used to construct a complex high-speed interface topology (e.g. a NAND interface topology).

The communication protocol may provide for a time-stamp field to be applied to help ensure that commands are executed in a correct sequence. This can indicate a relative time that the command was created, so that the correct sequence of commands can be established by the receiving IC package or die. In some embodiments, the transmit and receive channels of the communication protocol operate independently and allow die or bridge devices to send asynchronous status commands.

In some embodiments, the communication protocol "packetizes" Open NAND Flash Interface (ONFI) or Toggle mode flash commands into "packets" of data that travel on the high-speed serial interface. A "packet" can include a command or status message, and can include source and destination topology addresses for devices that are exchanging data. The packet's payload data can include the actual ONFI/Toggle command and read/write NAND FLASH data. The packet would also include a checksum field, such as a cyclic redundancy check (CRC) word to indicate if the packet contains any data errors. The packet length can be variable to accommodate for variable length flash commands. The communication protocol may include combining multiple commands to a same device (e.g. to a same IC package or same die) in one packet.

The communication protocol may provide for "broadcast" messages to be sent simultaneously to all or a subset of all the IC packages or die. Thus one command can trigger multiple status messages. When replying to a command, the IC package or die can use its unique topology address so that the control device 102 knows which device the response came from.

The communication protocol can provide for adjusting the data transmission rate ("baud-rate") to save power. When there are a small number of NAND devices connected to a single high-speed connection, then the full data bandwidth may not be needed. In this situation, the baud-rate of the interface can be reduced.

In some embodiments, the protocol can detect lane reversal, and automatically swap the lanes so that the ordering is correct. Sometimes it is desirable to swap the high-speed lanes to make PCB routing easier.

In some embodiments, the package interface 116 supports a low-power mode, when the package interface 116 is disabled in a low-power, standby state. This can be implemented in-between commands that take a long time to execute (e.g. erase commands), or when there is no data or little data to send from the control device 102 to the bridge device 104. The communication protocols may provide for the package interface 116 to be brought back online very quickly so that data can be exchanged without incurring a lot of start-up latency.

The communication protocol implemented by the package interface 116 provides for detecting the polarity of the high-speed connection, and automatically correcting the polarity. In some embodiments, it is desirable to swap differential pair connections (e.g. pins) to make printed circuit board (PCB) routing easier. The communication protocol can be configured to automatically detect this situation and correct it with a logical inversion of the received high-speed data.

The error correction engine 118 can implement an error correction protocol, such as a Bose Chaudhuri Hocquengheim (BCH), Quadruple Swing-By Code (QSBC) or Low Density Parity Check (LDPC) coding scheme to allow for data errors to be detected and corrected by the control device 102 (e.g. data errors from the IC package 106, such as read errors from a NAND flash device). The error correction engine 118 is optional, and in some implementations, at least a portion of the error correction protocol is performed by the bridge device 104, thus offloading at least some error correction functionality to the bridge device 104. Thus the bridge device 104 may be swapped with a new bridge device to upgrade or change the error correction protocol without needing to swap or modify the control device 102. This also provides for a smaller controller device 102. In some embodiments, the bridge device 104 is configured to implement a re-programmable error correction method and the error correction engine 118 is configured to transmit error correction firmware or software to the bridge device 104. Thus, the error correction protocol of the bridge device 104 may be upgraded or changed without swapping the bridge device 104. In some embodiments, the error correction protocol may implement a frame checksum sequence (FCS), such as a cyclic redundancy check (CRC) to ensure that packets of data are valid. The error correction protocol might also utilize a liner feedback shift register (LFSR) to implement scrambling/descrambling functions to randomize the data stored/reduce data read errors in NAND flash memory, thereby improving data reliability. When the control device 102 exchanges data with the IC packages or die via the package interface 116, status bits can be used to indicate if read data returned by the NAND device has been error-corrected, or if the data requires data correction, to facilitate the error correction protocol.

Thus, the control device 102 provides for supporting a large number of IC packages while suppressing a pin count of the control device 102. Such a control device 102 can be less expensive to manufacture than alternative devices. In addition, the Ser/Des connection used by the control device 102 may consume less power than alternative interfaces. In embodiments where variable Ser/Des shift register clocking is used, power consumption may be further reduced by reducing the clock rate when high data transfer rate performance is not required. Also, in embodiments in which the Ser/Des connection is self-timed (the clock used to transmit the data can be recovered from the data), a process of DQS training on the interface can be omitted. Furthermore, there may be fewer interface signals to connect between the control device 102 and the bridge device 104, and thus a design of a PCB for the mounting of the control device 102 can be simplified. This can further reduce the size of the control device 102. Furthermore, it is possible for the interface signal connections to be longer, and thus allow larger PCBs to be created.

An alternative embodiment may use a 2.5D silicon technique with a silicon interposer. The bridge chip and multiple NAND die could be mounted on a silicon interposer technology. The serial connections could be made on the silicon interposer.

Referring now to the bridge device 104, the bridge device 104 includes a processor 120 (e.g. one or more microprocessors, application-specific integrated circuits (ASICs), a field-programmable gate array (FPGA), etc., or combinations thereof), a memory 122, an interface 124, and an error corrector 126. The memory 122 may include one or more functional modules for accessing the interface 124 and the error corrector 126. The memory may include a buffer 128, described in more detail below. The bridge device 104 further includes pins, including pins P1B through P8B.

The bridge device 104 may include at least pins P1B through P4B for communicating with the control device 102. Thus, the bridge device 104 may communicate with the control device 102 via at least 4 pins. In some embodiments, the bridge device 104 may interface with the control device 102 via no more than 4 pins. In some embodiments employing multiple lane connections, the number of pins is multiplied by the number of lanes. In some embodiments, the bridge device 104 includes at least two additional pins for receiving signals from the control device 102, and at least two additional pins for transmitting signals to the control device 102. Thus, the bridge device 104 may interface with the control device 102 via at least 8 pins, in some embodiments. In some embodiments, the bridge device 104 may interface with the control device 102 via no more than 8 pins.

The bridge device 104 may include at least pins P5B through P8B for communicating with the IC packages 106 and 108 in parallel. Thus, the bridge device 104 may communicate with the IC packages 106 and 108 in parallel via at least 4 pins. In some embodiments, the bridge device 104 may interface with the IC packages 106 and 108 in parallel via no more than 4 pins. In some embodiments, the bridge device 104 includes at least two additional pins for receiving signals from the IC packages 106 and 108, and at least two additional pins for transmitting signals to the IC packages 106 and 108. Thus, the bridge device 104 may interface with the IC packages 106 and 108 in parallel via at least 8 pins, in some embodiments. In some embodiments, the bridge device 104 may interface with the IC packages 106 and 108 in parallel via no more than 8 pins.

In some embodiments, the bridge device 104 is connected to the IC packages 106 and 108 (e.g. to the die of the IC packages 106 and 108) via wire-bonding techniques or via through silicon vias (TSVs).

The interface 124 may include a control device interface 124a for interfacing with the package interface 116 of the control device 102, and a package interface 124b for interfacing with the IC packages 106 and 108. The control device interface 124a may be configured to serially connect to the package interface 116 (e.g., through at least pins P1B through P4B), and may be configured to implement Ser/Des functionality, such as any of the Ser/Des functionality described herein. The package interface 124b may be configured to connect, in parallel, to the IC packages 106 and 108 (e.g., through at least pins P5B through P8B, which can provide for transmitting differential signals and for receiving differential signals in parallel to the IC packages 106 and 108). The interface 124 may implement any of the Ser/Des protocols, the PCS protocols, or any other communication protocols described herein, including the protocols discussed above with reference to control device 102, and with reference to the package interface 116 of the control device 102.

In some embodiments, the interface 124 may include or may access a lookup table or other data structure that associates a unique system address and a destination IC package and/or die. The interface 124 may receive, from the control device 102, a request to access memory corresponding to the unique system address, and the interface 124 may generate one or more access requests, such as a read or write request, to transmit to the specified IC package via the package interface 124b. In some embodiments, the bridge device 104 may transmit, in parallel, the request to all of a plurality of destination IC packages.

The error corrector 126 may logic, hardware, or firmware for implementing error correction for communications between the control device 102 and the IC packages 106 and 108 that are transmitted via the bridge device 104. Similar to the protocols described above with respect to the error correction engine 118, the error corrector 126 can implement an error correction protocol such as a Bose Chaudhuri Hocquengheim (BCH), Quadruple Swing-By Code (QSBC) or Low Density Parity Check (LDPC) coding scheme to allow for data errors to be detected and corrected (e.g. data errors from the IC package 106, such as read errors from a NAND flash device). This provides for offloading at least some error correction functionality from the control device 102 to the bridge device 104, which can allow for a smaller control device 102. In some implementations the bridge device 104 may be swapped with a new bridge device to upgrade or change the error correction protocol without needing to swap or modify the control device 102. In some embodiments, the error corrector 126 is configured to implement a re-programmable error correction method. For example, the error corrector 126 may access error correction firmware 130 stored on, or accessible to, the bridge device 104, and may implement the error correction protocol using the error correction firmware 130. In some implementations, the error correction engine 118 of the control device 102 is configured to transmit updated or different error correction firmware to the bridge device 104, and the bridge device 104 may replace or update the error correction firmware 130 based on the transmitted error correction firmware. Thus, the error correction protocol of the bridge device 104 may be upgraded or changed without swapping the bridge device 104. In some embodiments, the error correction protocol may implement a frame checksum sequence (FCS), such as a cyclic redundancy check (CRC) to ensure that packets of data transferred are valid. The error correction protocol might also utilize a liner feedback shift register (LFSR) to implement scrambling/descrambling functions to randomize the data stored and reduce data read errors in NAND flash memory thereby improving data reliability. When the bridge device 104 transmits data to the control device 102, the error corrector 126 can generate status bits for the data that indicate if read data returned by at least one of the IC packages 106 or 108 has been error-corrected, or if the data requires data correction, to facilitate the error correction protocol.

The buffer 128 can be used by the bridge device 104 to implement local command buffering, allowing the control device 102 to issue a large number of commands to a plurality of die, and then receive the results of these commands asynchronously as they are processed by the IC packages 106 and 108. Thus, the control device 102's inputs/outputs per second (IOPS) can be improved, since a large number of commands can be executed in parallel.

Referring now to the IC package 106, the IC package 106 includes a controller 132 and a plurality of die 136, including die 136a through die 136n. The controller 132 may include one or more processors (e.g. one or more microprocessors, application-specific integrated circuits (ASICs), a field-programmable gate array (FPGA), etc., or combinations thereof) and memory storing logic for accessing the plurality of die 136 and for communicating with the bridge device 104. The IC package 106 also includes pins P1C through P4C that connect to pins of the bridge device 104 (e.g. pins P5B through P8B of the bridge device 104). Pins P1C and P2C may be configured to receive a differential signal from the bridge device 104, and pins P3C and P4C may be configured to transmit a differential signal to the bridge device 104. In some implementations, the IC package 106 includes additional pins for communicating with the bridge device 104 (e.g. 4 additional pins, or more).

The IC package 106 may be a memory device, such as a NAND flash memory device. In some embodiments, the die 136 may include one or more die. The die 136 may include, or may define, a memory cell array. The controller 134 may include logic and circuits for accessing the memory cell array and for implementing commands received from the bridge device 104 (e.g. read or write commands). The controller 132 may include, for example, any of an input/output control circuit, a logic control, a status register, an address register, a command register, a high voltage generator, a column buffer, a column decoder, a data register, a sense amplifier, and a row address decoder.

The IC package 108 includes a controller 134, a plurality of die 138 including die 138a through 138n, and pins P1D through P4D. The IC package 108 may be similar to the IC package 106, and the components of the IC package 108 may be similar to the corresponding components of the IC package 106 described herein. In some embodiments, the IC package 108 may be omitted from the communication system 100. In some embodiments, the communication system 100 may include IC packages in addition to the IC packages 106 and 108. In some embodiments, two or more IC packages may communicate directly without involving the control device 102 (via, for example, the bridge device 104 or another pathway), for example, to co-ordinate erase command scheduling so that simultaneous erase operations do not occur at the same time which may cause a high power situation to occur. It is also possible for IC package commands to be completed at different times by different IC packages. To avoid having control device 102 poll the status of a command, the IC packages may be configured to send status messages without being prompted by the control device 102. The control device 102 may be configured to process the reports as they arrive, rather than request status messages directly.

Figure 2A:
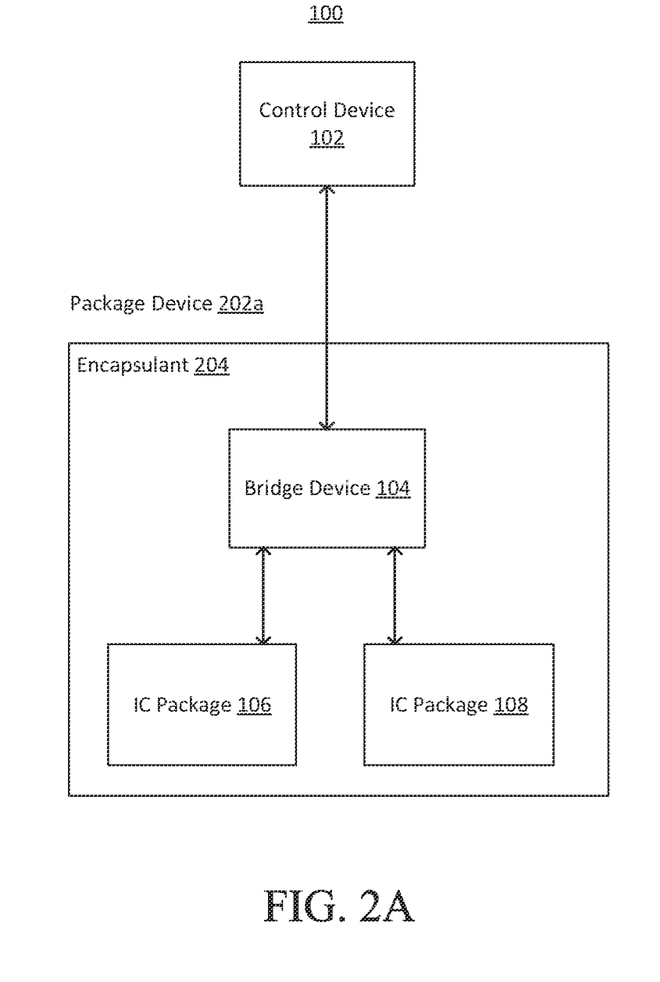
FIG. 2A, FIG. 2B, FIG. 2C, FIG. 2D, and FIG. 2E show different configurations of communication systems according to embodiments of the present disclosure.
Figure 2B:
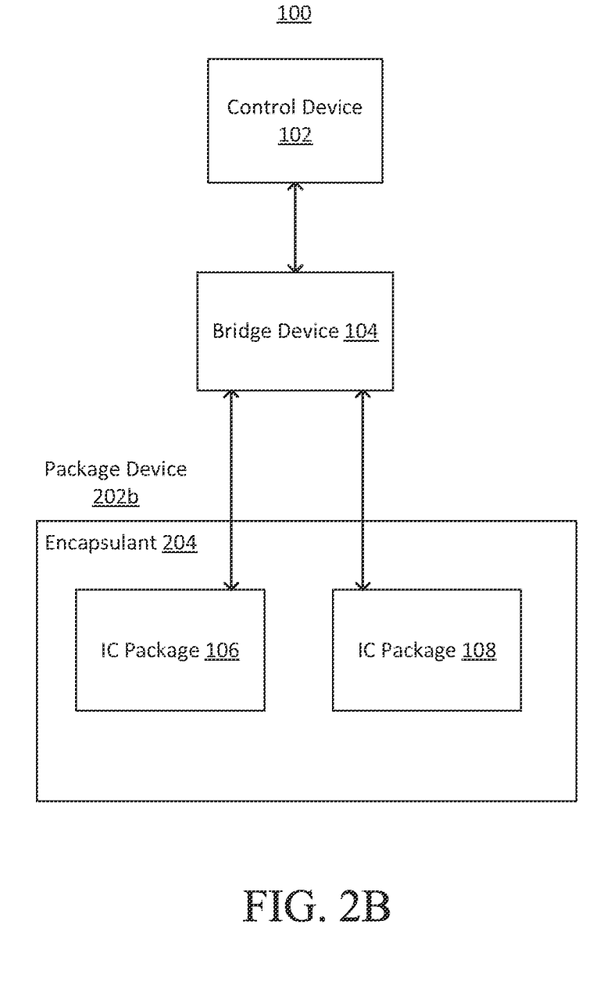

FIG. 2A and FIG. 2B show configurations of communication systems 100 that include different semiconductor package devices, according to embodiments of the present disclosure. FIG. 2A shows a communication system 100 in which a bridge device 104 is encapsulated in an encapsulant 204 along with IC packages 106 and 108. The encapsulated bridge device 104, the IC packages 106 and 108, and the encapsulant 204 constitute a package device 202a. The control device 102 communicatively connects to the package device 202a via the bridge device 104. The package device 202a provides for improved structural support and protection for the bridge device 104, the IC package 106, and the IC package 108 encapsulate by the encapsulant 204.

FIG. 2B shows a communication system 100 in which a bridge device 104 is disposed outside of an encapsulant 204 that encapsulates IC packages 106 and 108. The encapsulated IC packages 106 and 108 and the encapsulant 204 constitute a package device 202b. The control device 102 communicatively connects to the package device 202a via the bridge device 104. The package device 202b provides for readily changing, upgrading, repairing or otherwise maintaining components of the communication system 100. For example, the bridge device 104 or the package device 202b may be readily swapped for an upgraded or functional component (e.g. if the component fails), without having to swap or replace the other of the bridge device 104 or the package device 202b.

Figure 2C:
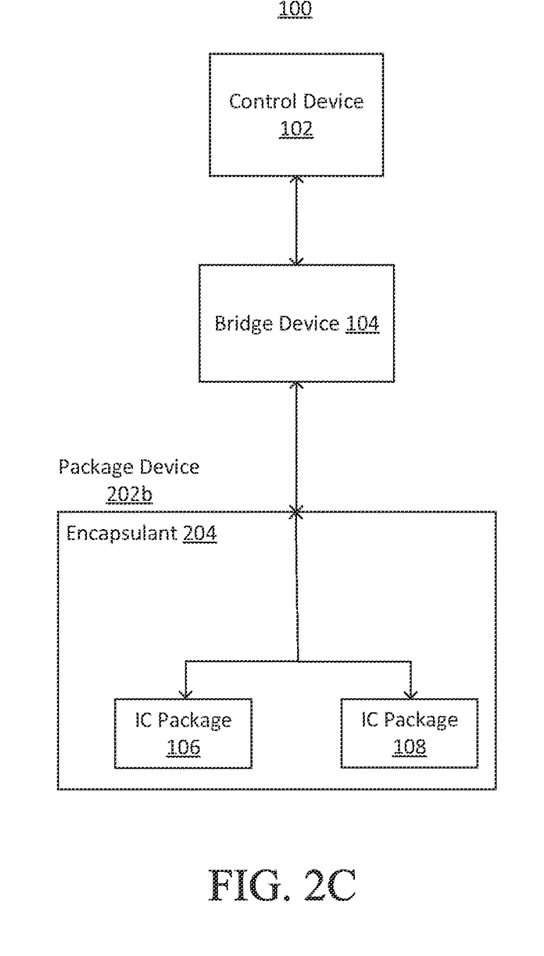

FIG. 2C shows a communication system 100 in which a bridge device 104 is disposed outside of a package device 202b. The package device 202b includes an IC package 106, and IC package 108, and an encapsulant 204 that encapsulates the IC package 106, and the IC package 108. In some embodiments, the package device 202b is a NAND flash device that includes the parallel bus. The depicted communication system 100 implements the parallel bus inside the package device 202b, and implements serial connections between the package device 202b and the bridge device 104, and between the bridge device 104 and the control device 102.

Figure 2D:
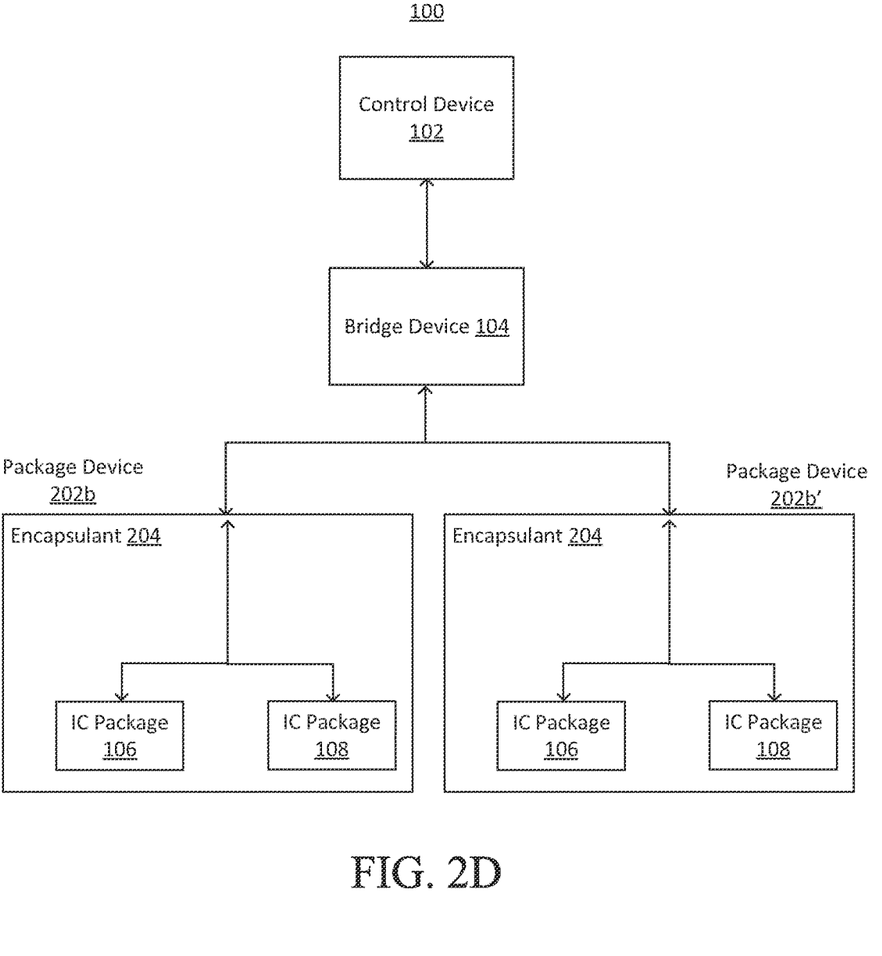

FIG. 2D shows a communication system 100 in which a bridge device 104 is disposed outside of a package device 202b and a package device 202b'. The communication system 100 shown in FIG. 2D is similar to that shown in FIG. 2C, but includes an additional package device. The package device 202b and the package device 202b' are connected in parallel to the bridge device 104.

Figure 2E:
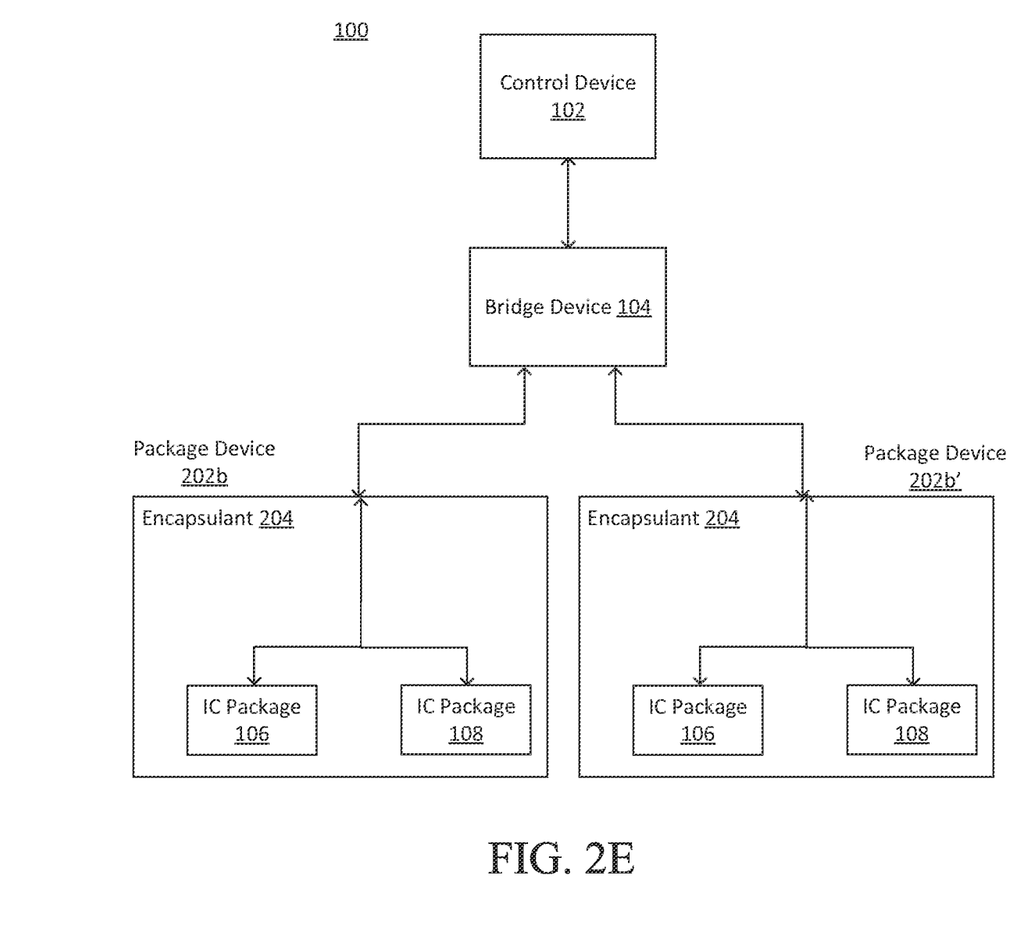

FIG. 2E shows a communication system 100 in which a bridge device 104 is disposed outside of a package device 202b and a package device 202b'. The communication system 100 shown in FIG. 2E is similar to that shown in FIG. 2D, but the package device 202b and the package device 202b' are connected in series to the bridge device 104.

Figure 3A:
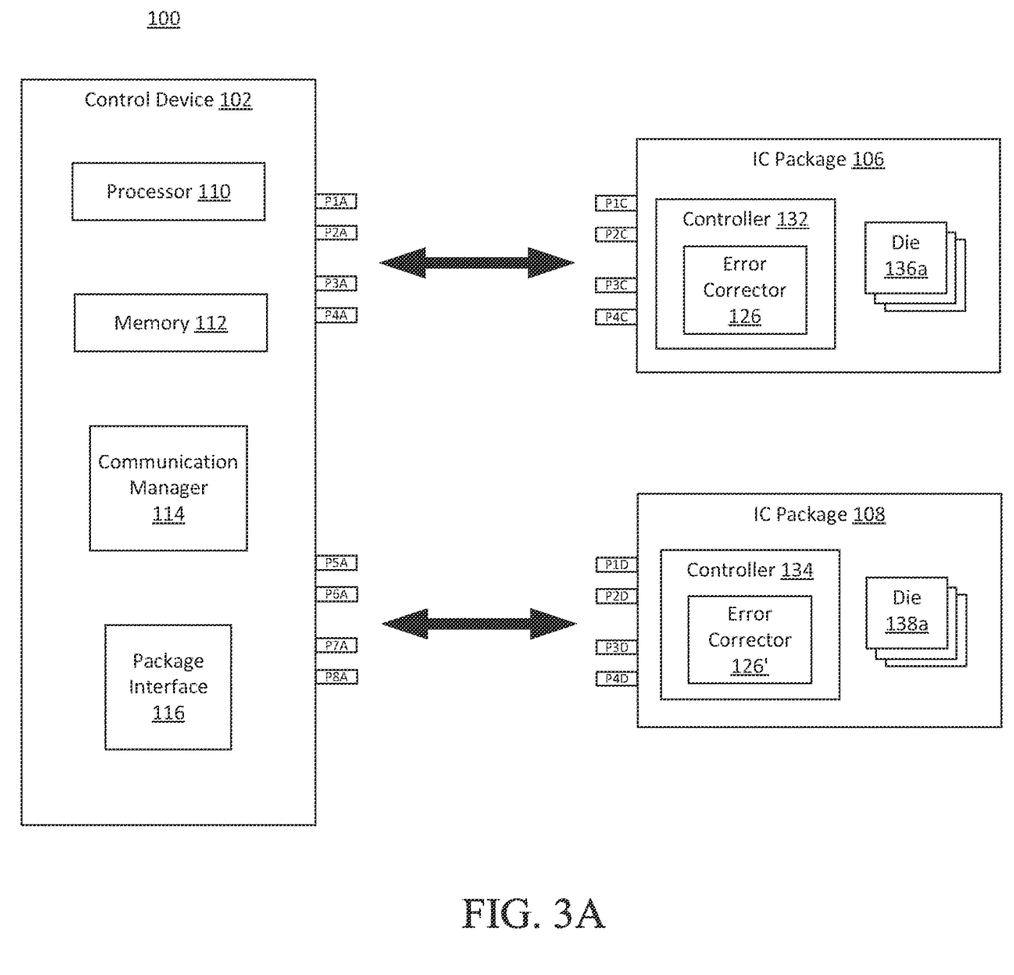
FIG. 3A, FIG. 3B, and FIG. 3C shows different integrated circuit packages each serially connected to an external controller according to one or more embodiments of the present disclosure.

FIG. 3A shows a modification of the communication system 100 that omits a bridge device 104, and that includes IC packages each serially connected to the control device 102, according to one or more embodiments of the present disclosure. The serial connections may be high-speed serial connections (e.g. implementing 10 MT per second or more). The serial connections may be implemented using any of the techniques, components, or protocols discussed herein.

The control device 102 shown in FIG. 3A includes at least pins P1A through P8A. The pins P1A and P2A can be configured to receive a differential signal from the IC package 106, and the pins P3A and P4A can be configured to transmit a differential signal to the IC package 106. The control device 102 may similar include at least four pins per connected IC package, such as pins P5A through P8A connected to IC package 108. In some embodiments, the control device 102 includes no more than four pins per connected IC package. In some embodiments, more than four pins are connected to each IC package (e.g. 8 pins, or more, are connected to each IC package). In some embodiments, no more than 8 pins are connected to each IC package. Thus, the pin count and the size of the control device 102 may be made small, while providing for high speed serial communication with the IC packages 106 and 108.

The IC package 106 may include a plurality of die 136, including die 136a through 136n. In some embodiments, each of the die 136 may have its own high-speed interface, implemented with a Ser/Des interface in, or connected to, the die 136, which is connected directly to pins of the IC package 106 (e.g. pins P1C through P4C) as a point-to-point serial connection. The IC package 108 may be similarly configured. For example, as shown in FIG. 3A, each IC package includes a controller that can manage the point-to-point connection with the control device 102, and that may be connected in parallel or in series to the die 136. The controller may also include an error corrector 126 for local error correction, as shown.

Figure 3B:
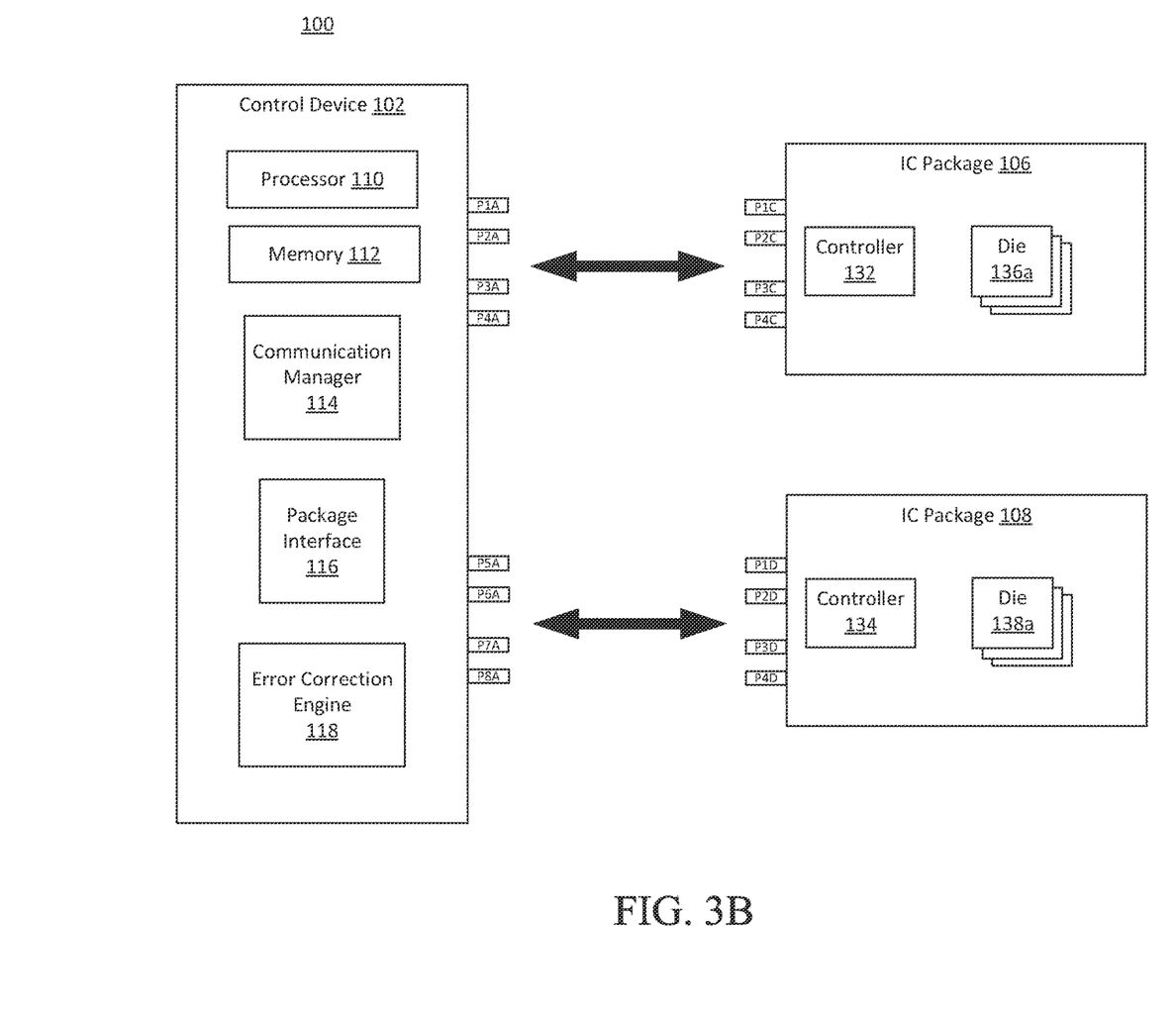

FIG. 3B shows a modification of the communication system 100 shown in FIG. 3A, in which the IC packages 106 and 108 do not include error correction functionality, and in which the control device 102 implements error correction using the error correction engine 118.

Figure 3C:
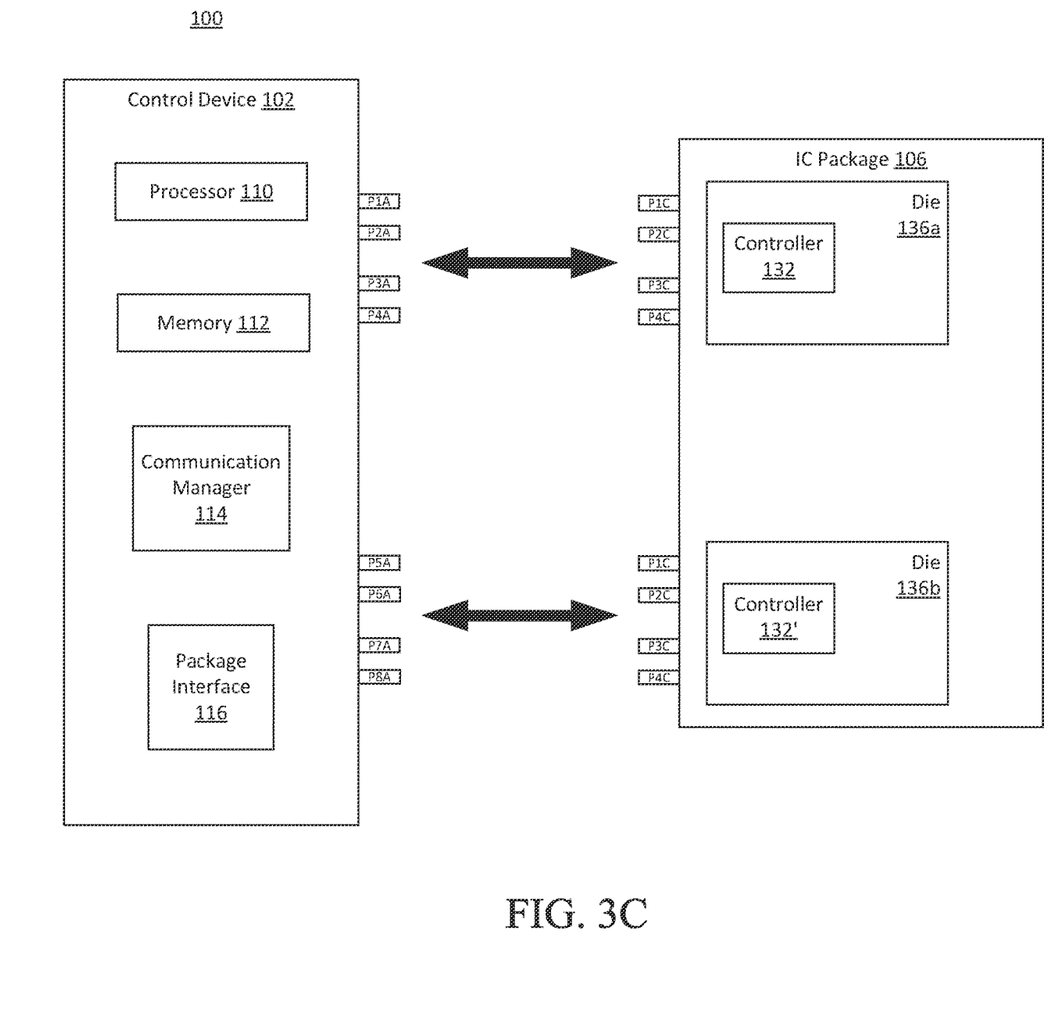

FIG. 3C shows another modification of the communication system 100 shown in FIG. 3A, in which at least two die 136 of the IC package 106 are each serially connected to the control device 102. The connection may be managed by die-specific controllers 132 and 132', which may be included on the die 136. In some embodiments, more than two die 136 may be implemented, or a single die 136 may be implemented. In some embodiments, additional IC packages may be implemented, which can include one or more die-specific serial connections, or other configurations described herein.

Figure 4:
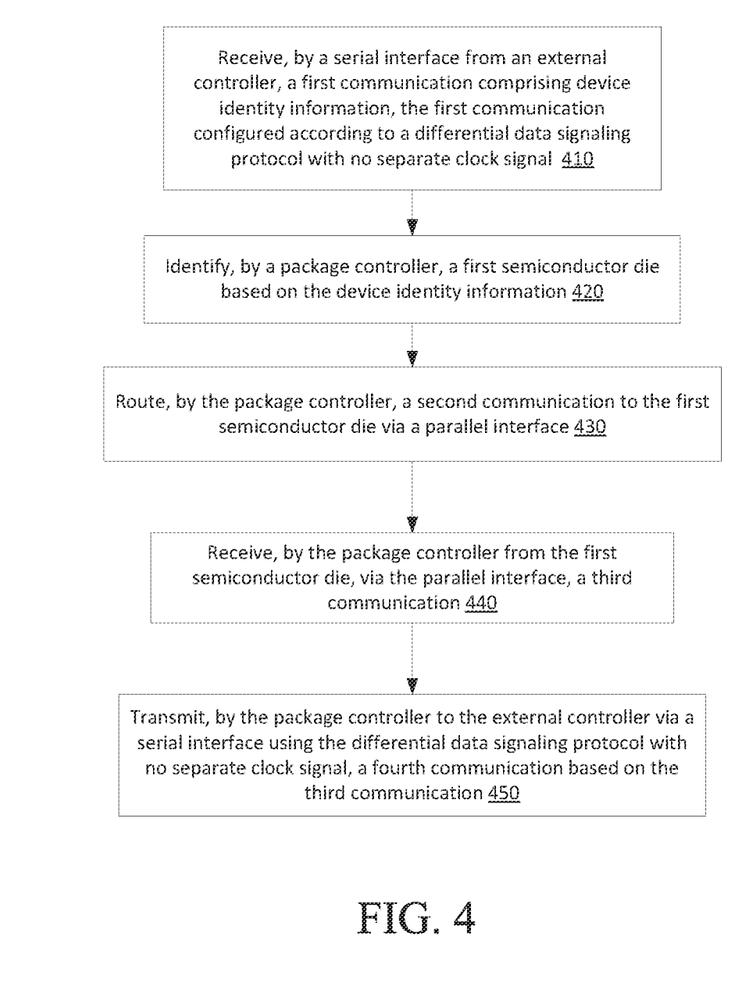
FIG. 4 is a flow chart showing a method for communication for a semiconductor package using a serial interface and a parallel interface, according to one or more embodiments of the present disclosure.

FIG. 4 shows a method for communication for a semiconductor package using a serial interface and a parallel interface, according to one or more embodiments of the present disclosure. The method includes blocks 410 through 450, and may be implemented using a communication system 100 as described herein. At block 410, a serial interface of a package device may receive, from an external controller, a first communication comprising device identity information, the first communication configured according to a differential data signaling protocol with no separate clock signal. At block 420, a package controller may identify a first semiconductor die based on the device identity information. At block 430, the package controller may route a second communication to the first semiconductor die via a parallel interface. At block 440, the package controller may receive, from the first semiconductor die via the parallel interface, a third communication. At block 450, the package controller may transmit, to the external controller via the serial interface using the differential data signaling protocol with no separate clock signal, a fourth communication based on the third communication.

In more detail, at block 410, the serial interface of the package device may receive, from the external controller, the first communication comprising device identity information, the first communication configured according to the differential data signaling protocol with no separate clock signal. For example, a bridge device 104 of a communication system 100 may receive, via a control device interface 124a, the first communication (e.g. a command) from a control device 102. The control device may configure the communication according to the differential data signaling protocol, such as according to an LVDS protocol or a CIVIL protocol. The control device 102 may configure the communication to include an embedded clock signal (e.g. included in a body of a data packet, or bodies of one or more data packets). The bridge device 104 may be configured to receive commands according to the differential data signaling protocol, and may be configured to reconstruct or decode the embedded clock signal. In some embodiments, the bridge device 104 can implement an "address" mechanism, allowing commands to be directed to a particular die. The address may be in a known location in the communication protocol to allow for easy decoding. An address field may also be used by inter-connect components in a "tree" topology to uniquely identify a single die in a complex topology. The address mechanism may include specifying device identify information (e.g. a virtual address) for a device that is a destination for the command.

At block 420, the package controller may identify the first semiconductor die based on the device identity information. The package controller may be a controller of the bridge device 104, and may include a processor 120, a memory 122, and an interface 124. The package controller may implement an error corrector 126 stored on the bridge device 104. In some embodiments, the interface 124 may include or may access a lookup table or other data structure that associates a unique system address and a destination IC package and/or die. The interface 124 may receive (e.g. as the first communication) a request to access memory corresponding to the unique system address, and the interface 124 may generate one or more access requests (e.g. as the second communication), such as a read or write request, to transmit to the specified IC package.

At block 430, the package controller may route the second communication to the first semiconductor die via the parallel interface. For example, the bridge device 104 may transmit the read or write request, or some other request, to the specified IC package via a package interface 124b of the interface 124. In some embodiments, the device identity information may specify a plurality of die included in a plurality of IC packages, and the bridge device 104 may transmit, in parallel, the request to all of the specified IC packages.

At block 440, the package controller may receive, from the first semiconductor die (e.g. a specified semiconductor die) via the parallel interface, the third communication. For example, the third communication can be a response to a read request, and can include requested data. The bridge device 104 may receive the third communication via the package interface 124b from the specified IC package that includes the specified semiconductor die. In some embodiments in which the bridge device 104 transmitted a request in parallel to a plurality of IC packages, the bridge device 104 may receive responses (third communications) asynchronously, and the bridge device 104 may store data received in the responses in a buffer 128 until all, or sufficient, data has been collected to report to the control device 102.

At block 450, the package controller may transmit, to the external controller via the serial interface using the differential data signaling protocol with no separate clock signal, the fourth communication based on the third communication. The fourth communication may be a processed version of the third communication. The fourth communication may be configured for differential signaling, and may include an embedded clock signal. In some embodiments, the fourth communication includes batched data received from a plurality of die disposed in a respective plurality of IC packages. The fourth communication may be transmitted via the control device interface 124a using the serial connection to the control device 102. Thus, the bridge device 104 may make effective use of Ser/Des techniques to implement improved communication with the control device 102.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

What is claimed is:

1. A system for serial communication, comprising:
a controller;
a semiconductor package comprising a semiconductor memory; and
a serial interface configured to connect the semiconductor memory to the controller, wherein the serial interface is configured to transfer data between the controller and the semiconductor memory at a speed of transfer that is variable by employing a signaling protocol, and wherein the serial interface is configured to transfer the data together with an encoded clock signal, the encoded clock signal having a rate associated with the variable speed of transfer of data, wherein the encoded clock signal is embedded together with the data in a transmitted signal.

2. The system of claim 1, wherein the speed of transfer of the data is communicated by the controller to the semiconductor memory using the serial interface and the signaling protocol.

3. The system of claim 2, wherein the serial interface is configured to implement a plurality of lanes using four pins per lane, and one of the plurality of lanes comprises the controller-to-package connection and the package-to-controller connection.

4. The system of claim 1, wherein the serial interface comprises a controller-to-package connection and a package-to-controller connection.

5. The system of claim 1, wherein the signaling protocol is one of LVDS and CML.

6. The system of claim 1, wherein the controller is configured to selectively set the rate of the encoded clock signal to minimize power consumption.

7. The system of claim 1, wherein the serial interface comprises a bridge device configured to serially connect to the controller, and wherein the semiconductor memory comprises a plurality of semiconductor die, and wherein the bride device is configured to connect to the plurality of semiconductor die in parallel, via at least one parallel bus connection.

8. The system of claim 7, wherein the bridge device is configured to implement an error correction technique.

9. The system of claim 8, wherein the bridge device is configured to reprogram the error correction technique based on instructions received from the controller.

10. The system of claim 7, wherein the serial interface is included in the semiconductor package, and the semiconductor package comprises an encapsulation material that encapsulates the plurality of semiconductor die and encapsulates the bridge device.

11. The system of claim 7, wherein the semiconductor package comprises an encapsulation material that encapsulates the plurality of semiconductor die, and the bridge device is disposed outside of the encapsulation material.

12. The system of claim 7, wherein the serial interface includes:
a controller-to-package connection comprising a first pin and a second pin connected to the controller, and the controller-to-package connection is configured to transmit a differential signal to the controller using the first pin and the second pin; and
a package-to-controller connection comprising a third pin and a fourth pin connected to the controller, and the package-to-controller connection is configured to receive a differential signal from the controller using the third pin and the fourth pin.

13. The system of claim 1, wherein the semiconductor memory comprises a plurality of semiconductor die, the system further comprising a plurality of serial interfaces including the serial interface, the plurality of serial interfaces respectively connecting the plurality of semiconductor die to the controller.

14. A semiconductor package, comprising:
a flash memory; and
a bridge device comprising a high-speed serial interface connected to an external controller and a parallel interface connected to the flash memory,
wherein the high-speed serial interface is configured to transfer data between the external controller and the flash memory at a speed of transfer that is variable by employing a signaling protocol, and
wherein the high-speed serial interface is configured to transfer the data together with an encoded clock signal, the encoded clock signal having a rate associated with the variable speed of transfer of data, wherein the encoded clock signal is embedded together with the data in a transmitted signal.

15. The semiconductor package of claim 14, wherein the bridge device is configured to implement an error correction technique according to error correction firmware accessible to the bridge device.

16. The semiconductor package of claim 15, wherein the bridge device is configured to reprogram the error correction firmware based on instructions received from the controller.

17. The semiconductor package of claim 14, wherein the bridge device comprises a controller configured to determine a device identification included in a first communication received via the high-speed serial interface, and configured to responsively transmit, based on the device identification, a second communication to the flash memory via the parallel interface.

18. A method for communication for a semiconductor package comprising a package controller, a serial interface, and a parallel interface, the method comprising:
receiving, by the serial interface from an external controller, a first communication comprising device identity information, the first communication configured to transfer data between the external controller and the semiconductor package at a speed of transfer that is variable according to a signaling protocol, wherein the serial interface is configured to transfer the data together with an encoded clock signal, the encoded clock signal having a rate associated with the variable speed of transfer of data, wherein the encoded clock signal is embedded together with the data in a transmitted signal;
identifying, by the package controller, a first semiconductor die based on the device identity information;
routing, by the package controller, a second communication to the first semiconductor die via the parallel interface;
receiving, by the package controller from the first semiconductor die, via the parallel interface, a third communication; and
transmitting, by the package controller to the external controller via the serial interface using the signaling protocol that includes the encoded clock signal, a fourth communication based on the third communication.

19. The method of claim 18, wherein the first communication is a command to perform an operation, and wherein the third communication indicates that the operation was implemented.

20. The method of claim 19, wherein the device identity information of the first communication specifies the first semiconductor die and a second semiconductor die, and further comprising:

receiving, by the package controller from the second semiconductor die, via the parallel interface, a fifth communication; and transmitting, by the package controller to the external controller via the serial interface, a sixth communication based on the fifth communication.

21. The method of claim 20, wherein the sixth communication is transmitted asynchronously with the fourth communication.

22. The method of claim 18, further comprising generating, by the package controller, the fourth communication responsive to receiving the third communication, and storing the fourth communication in a buffer for transmission to the external controller.

23. The method of claim 18, further comprising configuring, by the external controller, the rate of the encoded clock signal to minimize power consumption.

* * * * *